(12) United States Patent
Krüger et al.

(10) Patent No.: US 10,781,952 B2
(45) Date of Patent: Sep. 22, 2020

(54) HOSE CLAMP

(71) Applicants: NORMA Germany GmbH, Maintal (DE); Manfred Krüger, Büdingen (DE); Detlef Henrich, Limeshain (DE); Yassine Bennai, Vigneux sur Seine (FR)

(72) Inventors: Manfred Krüger, Büdingen (DE); Detlef Henrich, Limeshain (DE); Yassine Bennai, Vigneux sur Seine (FR)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 16/085,763

(22) PCT Filed: Mar. 15, 2017

(86) PCT No.: PCT/EP2017/056181
§ 371 (c)(1),
(2) Date: Sep. 17, 2018

(87) PCT Pub. No.: WO2017/158065
PCT Pub. Date: Sep. 21, 2017

(65) Prior Publication Data
US 2019/0093805 A1    Mar. 28, 2019

(30) Foreign Application Priority Data

Mar. 16, 2016   (DE) .......................... 10 2016 104 834

(51) Int. Cl.
*F16L 33/02*    (2006.01)

(52) U.S. Cl.
CPC ................................ *F16L 33/02* (2013.01)

(58) Field of Classification Search
CPC ........................................................ F16L 33/02
See application file for complete search history.

(56) References Cited

U.S. PATENT DOCUMENTS 1,746,033 A * 2/1930 Farmer .................. F16L 33/02
24/22
1,776,783 A * 9/1930 Cornell, Jr. ............. F16L 33/02
24/23 EE (Continued)

FOREIGN PATENT DOCUMENTS

DE    102006057497 A1    3/2008
DE    102006048344 A1    4/2008

(Continued)

OTHER PUBLICATIONS

International Search Report for PCT/EP2017/056181, dated May 23, 2017, 4 pages.

(Continued)

*Primary Examiner* — Jason W San
(74) *Attorney, Agent, or Firm* — Reising Ethington, P.C.

(57) ABSTRACT

A hose clamp comprising a clamping strip extending in a circumferential direction (L) and a tensioning device for tensioning the clamping strip. The clamping strip is provided with at least one clip element, by means of which the hose clamp can be secured on a hose at an axially determinable distance from a hose end. In order to prevent the clip element from canting during the tensioning of the hose clamp, the clip element is held on the clamping strip so that said element can move in the circumferential direction (L).

6 Claims, 2 Drawing Sheets

(56) References Cited

U.S. PATENT DOCUMENTS

| | | | | |
|---|---|---|---|---|
| 3,407,449 A * | 10/1968 | Tetzlaff | ............... | F16L 33/04 24/19 |
| 3,477,106 A * | 11/1969 | Tetzlaff | ............... | F16L 33/02 24/279 |
| 4,305,179 A * | 12/1981 | Sakurada | ............... | F16L 33/03 24/20 CW |
| 4,543,691 A * | 10/1985 | Calmettes | ............... | F16L 33/02 24/20 EE |
| 4,858,279 A * | 8/1989 | Kato | ............... | F16L 33/03 24/20 R |
| 4,890,360 A * | 1/1990 | Calmettes | ............... | F16L 33/035 24/20 R |
| 4,919,682 A * | 4/1990 | Bellazzi | ............... | F16L 33/035 24/20 EE |
| 4,924,558 A * | 5/1990 | Calmettes | ............... | F16L 33/035 24/20 CW |
| 4,930,191 A * | 6/1990 | Takahashi | ............... | F16L 33/03 24/20 CW |
| 4,930,192 A * | 6/1990 | Muhr | ............... | F16L 33/03 24/20 CW |
| 4,951,363 A * | 8/1990 | Takahashi | ............... | F16L 33/03 24/20 R |
| 5,309,607 A * | 5/1994 | Hohmann | ............... | F16L 33/02 24/20 CW |
| 5,664,295 A * | 9/1997 | Kume | ............... | F16L 33/03 24/20 CW |
| 5,706,862 A * | 1/1998 | Meinerding, Sr. | ............... | F16L 33/02 138/98 |
| 5,996,186 A * | 12/1999 | Yamada | ............... | F16L 33/03 24/20 EE |
| 6,942,253 B2 * | 9/2005 | Bowater | ............... | F16L 33/08 285/23 |
| 7,896,400 B2 * | 3/2011 | Brill | ............... | F02M 35/10144 285/23 |
| 8,607,422 B2 * | 12/2013 | Mohan | ............... | F16L 33/08 24/20 R |
| 2007/0186387 A1 * | 8/2007 | Ogino | ............... | F16L 33/025 24/20 R |
| 2011/0005040 A1 * | 1/2011 | Col | ............... | F16L 33/08 24/16 R |
| 2012/0246882 A1 * | 10/2012 | Mohan | ............... | F16L 33/08 24/274 WB |
| 2015/0226245 A1 * | 8/2015 | Frankel | ............... | F16B 2/20 24/482 |

FOREIGN PATENT DOCUMENTS

| | | |
|---|---|---|
| DE | 102008013207 A1 | 9/2009 |
| DE | 202011106374 U1 | 1/2012 |
| DE | 102012204370 A1 | 10/2012 |
| EP | 2163801 A1 | 3/2010 |
| EP | 2578918 A1 | 4/2013 |
| JP | 2010501797 A | 1/2010 |
| KR | 1020100120366 A | 11/2010 |
| WO | 2009109484 A1 | 9/2009 |

OTHER PUBLICATIONS

English Translation of International Search Report for PCT/EP2017/056181, dated May 23, 2017, 3 pages.

1st German Office Action for DE 10 2016 104 834.8 dated Jan. 12, 2017, 5 pages.

First Japanese Office Action for Japanese Patent Application No. 2018-549160, dated Nov. 12, 2019 (5 pages).

English Computer Translation of First Japanese Office Action for Japanese Patent Application No. 2018-549160, dated Nov. 12, 2019 (7 pages).

* cited by examiner

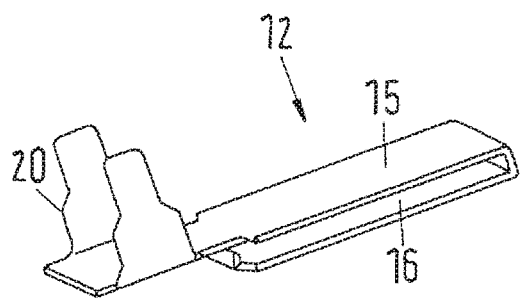
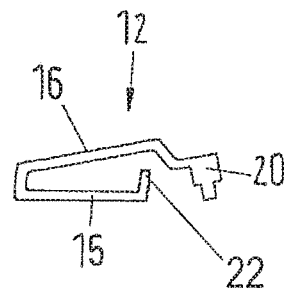
Fig. 1
Fig. 2a
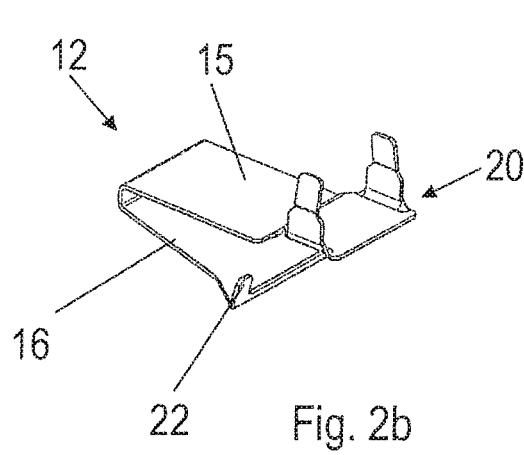
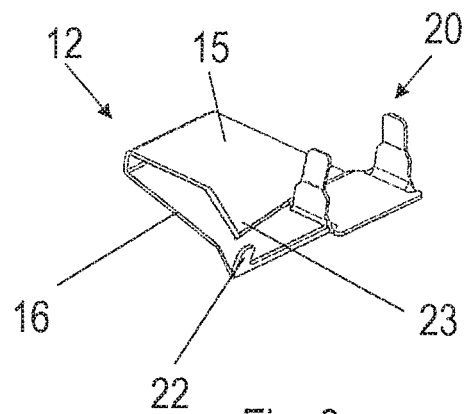
Fig. 2b
Fig. 2c
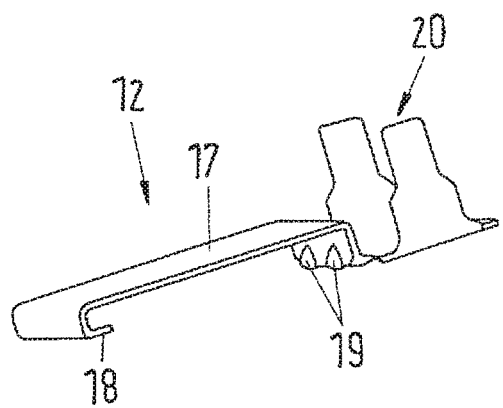
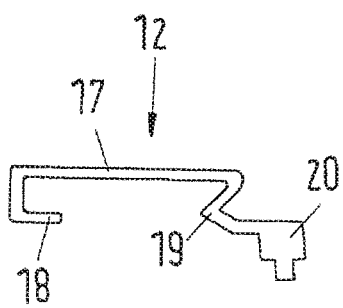
Fig. 3
Fig. 4

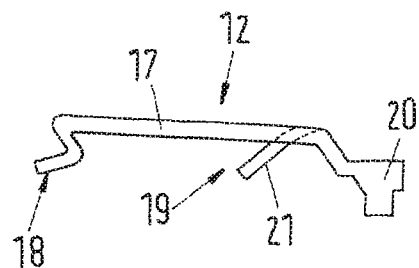
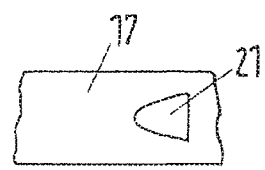
Fig.5    Fig.6
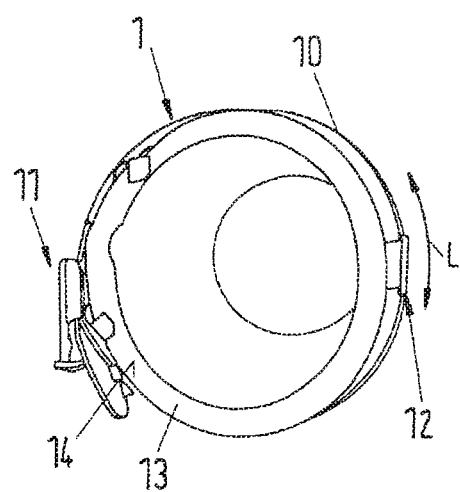
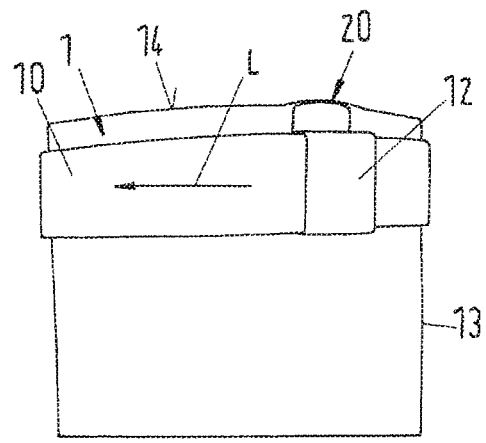
Fig.7    Fig.8

HOSE CLAMP

INTRODUCTION

The present disclosure relates to a hose clamp having a clamp band which extends in a peripheral direction and having a clamping device for clamping the clamp band, wherein there is arranged on the clamp band at least one clip element, by means of which the hose clamp can be fixed to a hose with an axially determined spacing with respect to a hose end.

DE 10 2006 057 497 A1 discloses a hose clamp of the type involved here in which there is arranged on the clamp band a clip element which is used to fix the unclamped hose clamp to the hose end. The clip element is pressed or crimped with a fixing device, for example, in or on the hose end, so that the clip element is positioned to the greatest possible extent in a non-releasable manner on the hose end. The clip element in this instance retains the clamp band of the hose clamp securely in a positive-locking manner, wherein in order to connect the clip element to the clamp band a clamping, a riveting or another releasable compression is proposed. When the clamping device is tightened in order to clamp the hose clamp to the hose end, the clamp band is intended to be released from the connection to the clip element so that the clamp band can be completely applied to the surface of the hose. Subsequently, the clip element remains functionless on the hose.

When the hose clamp is clamped to the hose end, a portion of the clamp band is pulled into the clamping device. If, for example, a plurality of clip elements for prefixing the hose clamp to the hose are located in different positions on the clamp band, the clip elements which have previously been pressed or crimped on the hose end can be incorrectly clamped. The incorrect clamping results from the pulling-in movement of the clamp band in the clamping device. The consequence is a twisting and misalignment of the hose clamp on the hose. During clamping, the diameter of the hose clamp is reduced and the clamp band is displaced in the peripheral direction of the hose so that a tilting or jamming of the clip elements results. The misalignment of the hose clamp on the hose may ultimately lead to an incorrect assembly of the hose clamp and the hose clamp may not correctly perform a generally desired retention and sealing function.

SUMMARY

An object of the disclosure, in an embodiment, is to provide a hose clamp, which has at least one clip element by means of which the hose clamp can be fixed to a hose end of a hose and by means of which an incorrect assembly of the hose clamp is intended to be prevented. In particular, the construction of the clip element is intended to be improved in order to prevent incorrect assembly.

The disclosure, in an embodiment, includes the technical teaching that the clip element is received on the clamp band so as to be able to be moved in the peripheral direction.

An embodiment of the disclosure involves in this instance a special connection form of the clip element with respect to the clamp band. The connection form is constructed in such a manner that the hose clamp can be secured to the hose by activating the clamping device without an incorrect positioning of the clip elements occurring. If the clamping device is activated and the clamp band is pulled into the clamping device, the clamp band can be pulled through the clip element without the clip element as a result of a displacement of the clamp band in the peripheral direction thereof being subjected to an oblique positioning or other misalignment. The clamp band and the clip element are thus axially and where applicable radially fixed relative to each other, but movable relative to each other in the peripheral direction. As a result, a secure assembly of the hose clamp which is prefixed to the hose end by means of at least one clip element is achieved and there is no possibility of incorrectly positioning the hose clamp which is tightened on the hose end. If the assembly diameter of the hose clamp has to become relatively large in relation to the diameter in the tensioned state in order to be able to be arranged at the hose end, a longer portion of the clamp band has to be pulled into the clamping device. In particular for such applications, the connection according to an embodiment affords particular advantages between the clip element and the clamp band.

The clip element is received on the clamp band in such a manner that the clip element can be displaced with a specific movement force in the peripheral direction on the clamp band. It is thereby possible for the clip elements on the clamp band to be able to be prefixed at predetermined locations in a frictionally engaging manner without the clip element also being displaced in the peripheral direction when the clamp band is displaced when the hose clamp is tightened. As a result, however, the clip element remains at the prefixed position thereof on the clamp band so that incorrect assembly as a result of a loose clip element being displaced is also prevented. The connection can be adjusted in such a manner that there is produced a movement force which enables the clip element to retain itself at the predetermined position of the clamp band. If the hose clamp is tightened, however, the clamp band can be pulled through the clip element in the peripheral direction.

For example, the clip element is received on the clamp band in such a manner that the clip element at least partially engages around the clamp band in a positive-locking manner. The positive-locking connection is not carried out in this instance in the peripheral direction of the clamp band so that the clamp band can be pulled with a remaining degree of freedom through the clip element. The positive-locking connection by the clip element is in this instance formed in such a manner that the clip element at least partially engages around the clamp band. If the clip element is arranged accordingly on the clamp band and the hose clamp is prefixed to the hose, the clip element cannot as a result of the provided positive-locking geometry be released from the clamp band without not previously tightening the hose clamp.

For example, the clip element has a U-shaped surrounding member having an outer member and an inner member, wherein the clamp band is guided through between the members. When the hose clamp is tightened on the hose, the inner member is clamped between the clamp band and the surface of the hose so that the clip element after the tightening of the hose clamp remains on the arrangement without performing another function. The clamp band extends between the outer member and the inner member, which members do not necessarily have to extend parallel with each other and may be orientated at an angle with respect to each other. The inner member or the outer member is adjoined by a fixing formation of the clip element. The fixing formation serves to fix the clip element to the hose end, for example, by means of pressing or crimping.

In order to securely arrange the clip element on the clamp band, there may be provided on the inner member and/or on the outer member retention flaps which may, for example, be bent around the clamp band. In this instance, an advantageous development in an embodiment involves providing on the inner or outer member opposite the retention flaps lateral wings around which the retention flaps are bent. The clip element is thereby closed around the clamp band, wherein a contact between the retention flaps and clamp band is prevented. A jamming of the clip element as a result of excessively powerful pressure of the retention flaps on the clamp band is thus prevented.

Alternatively, the clip element has a C-shape with a base member which extends at the outer side on the clamp band, wherein at the end sides of the base member surrounding members for forming the C-shape are formed and wherein a surrounding member is adjoined by a fixing formation for fixing the clip element to the hose end. The variant of the clip element with a C-shape has the advantage that, in an embodiment, when the hose clamp is tightened on the hose, the clamp band can be released from the clip element, wherein there is no further member between the clamp band and the surface of the hose when the hose clamp is tightened on the hose. If according to the disclosure the clamp band is intended to remain movable in the peripheral direction through the C-shaped positive-locking geometry of the clip element, however, the loss security of the clip element is not as high as with a U-shaped dual-sided engagement round the clamp band by the clip element.

In a further advantageous manner, in an embodiment, the surrounding member is formed at a free end side by means of a bent end of the base member, wherein there is provision for the surrounding member to be formed at the end side, which is adjoined by the fixing formation, by means of a flap which is notched from the base member. If the clip element is arranged on the clamp band, the bent end of the base member engages around a first edge side of the clamp band and an opposing edge side of the clamp band is surrounded by the notched flap.

The clip element can be released from the clamp band when the clamp band is secured to the hose and clamped with the clamping device. Alternatively, the clip element may remain on the clamp band if the hose clamp is clamped to the hose, whereby the function of the hose clamp for securing the hose, for example, to a connection piece or the like, is not impaired.

BRIEF DESCRIPTION OF THE FIGURES

Other measures which improve the disclosure are set out in greater detail below together with the description of a preferred embodiment of the disclosure with reference to the Figures. In the drawings:

FIG. 1 shows an embodiment of a clip element for a hose clamp having a U-shaped surrounding member, FIGS. 2a to 2c are side views of developments of the clip element for arrangement on a clamp band according to FIG. 1, FIG. 3 shows an embodiment of a clip element for a hose clamp having a C-shaped configuration, FIG. 4 is a side view of the clip element according to FIG. 3, FIG. 5 shows another variant of the clip element according to FIG. 3 with a surrounding member for enclosing the clamp band, which surrounding member is formed by a notched flap in the base member, FIG. 6 is a plan view of the base member of the clip element, which is constructed in accordance with a C-shape, FIG. 7 is a plan view of a hose end of a hose with a hose clamp comprising a clip element, and FIG. 8 is a side view of the hose with the hose clamp according to FIG. 7.

DETAILED DESCRIPTION

FIG. 1 shows an embodiment of a clip element 12 for arrangement according to the disclosure on a clamp band of a hose clamp. The clip element 12 is constructed as a punched/bent component and has, for example, a spring steel material. The clip element 12 has an inner member 15 and an outer member 16. The clamp band 10 may be guided through between the members 15 and 16. The members 15 and 16 in this instance surround the clamp band 10 substantially completely so that the clip element 12 with the exception of a degree of freedom in a peripheral direction of the clamp band can be arranged on the clamp band in a positive-locking manner. A side of the inner member 15 is adjoined by a fixing formation 20. With the fixing formation 20, the hose clamp can be secured to a hose end of a hose for assembly preparation, for example, by means of pressing or crimping.

The fixing formation 20 has two inwardly bent retention webs which where applicable can penetrate into the outer side of a hose. The retention webs may thus already bring about a secure retention of the clip element 12 and consequently of the hose clamp on the hose end before the hose clamp is clamped. The clip element thus enables secure pre-positioning.

FIG. 2a is a side view of a modified clip element 12 with the inner member 15 and the outer member 16, in which the fixing formation adjoins the outer member 16. If the clip element 12 is secured to the clamp band, the inner member 15 is located between the clamp band and the outer side of the hose. If the fixing formation 20 is secured to the hose end, the outer member 16 bends closed in such a manner that the clamp band is, for example, lightly clamped between the members 15, 16. The light clamping in this instance, with the application of a very small tensile force, enables the clamp band to slide through the gap between the inner member 15 and the outer member 16. If the clamp band is pulled into the clamping device of the hose clamp, the clip element 12 can thereby retain the desired position on the hose end, without, for example, also being pulled with the clamp band. A misalignment of the clip element 12 is consequently prevented.

In FIG. 2b, the clip element 12 is illustrated as a spatial illustration. At a free end of the outer member 16, there are formed retention projections 22 with which the members 15, 16 of the clip element 12 can be closed. By means of appropriate bending of the retention projections 22, they are placed around the clamp band and the clip element 12 is consequently retained on the clamp band in a positive-locking manner. The retention projections 22 are located in this instance in the peripheral direction at the outer corners of the outer member 16 and may thus when viewed in the peripheral direction beside the inner member 15 come into direct abutment with the clamp band.

FIG. 2c shows a development in which the inner member has lateral wings 23 which are formed by means of an expansion of the inner member 15 in the peripheral direction. After closure of the clip element 12 around the clamp band, the retention projections 22 can then be bent in such a manner that they move into abutment with the wings 23. A positive-locking connection is thus also obtained, wherein in contrast to the embodiment according to FIG. 2b, however, there is not produced any direct contact of the retention projections 22 with the clamp band.

FIG. 3 shows an alternative embodiment of a clip element 12 with a base member 17. At a first end side, the base member 17 has a surrounding member 18 which is formed by means of a region which is bent in a U-shaped manner. Another surrounding member 19 at an opposing end region of the base member 17 is formed by means of protuberances from the base member 17, wherein the fixing formation 20 adjoins the surrounding member 19 and consequently the region of the protuberances.

In place of the illustrated two protuberances, only a single protuberance which in this instance may in particular extend over the entire width of the clip element 12 may also be provided.

FIG. 4 is a side view of the clip element 12 according to the embodiment in FIG. 3. The base member 17 is located when the clip element 12 is arranged on the clamp band at the outer side of the clamp band and not between the clamp band and the surface of the hose. The side view shows the surrounding member 18 for positive-locking enclosure of an edge region of the clamp band. Furthermore, the surrounding member 19 also enables a positive-locking enclosure of the clamp band opposite the surrounding member 18. The surrounding member 19 is adjoined by the fixing formation 20.

FIG. 5 shows another embodiment of a clip element 12 according to the variant according to FIG. 3 and FIG. 4, wherein unlike the configuration of the surrounding member 19 there is provided a flap 21 which is notched or cut out of the base member 17. The flap 21 protrudes in this instance from the plane of the base member 17 and forms a surrounding member for the retaining arrangement of the clamp band so that the flap 21 forms a positive-locking geometry with the opposing end-side surrounding member 18 for receiving the clamp band. The fixing formation 20 adjoins the notched region for forming the flap 21. FIG. 6 shows in this instance a plan view of the base member 17 with the notched flap 21.

FIGS. 7 and 8 show an arrangement of a hose clamp 1 on a hose 13. The hose 13 is shown in the region of the hose end 14, wherein the hose clamp 1 is illustrated in FIG. 7 as a plan view and in FIG. 8 as a side view.

Opposite a clamping device 11 of the hose clamp 1 there is a clip element 12 which is received on the clamp band 10. The clamp band 10 can be guided through the clip element 12 in the illustrated peripheral direction L. In this instance, the clip element 12 is pressed or crimped with the fixing formation 20 on the hose end 14. When the clamping device 11 is activated, however, the clamp band 10 may move through the clip element 12. This results in the advantage that the clip element 12 remains in the position shown, whilst the hose clamp 1 is clamped to the hose 13. For example, the clip element 12 is located opposite the clamping device 11. If the clamping device 11 is operated, an end region of the clamp band 10 moves into the clamping device 11. In this instance, the clamp band 10 is finally completely in abutment with the outer side of the hose 13, wherein the clamp band 10 moves through the clip element 12 without the position thereof on the hose 13 or on the hose end 14 being changed.

The invention is not limited in its configuration to the preferred embodiments set out above. Instead, there are conceivable a number of variants which make use of the illustrated solution, even with embodiments which are of different types in principle. All the features and/or advantages set out in the claims, the description or the drawings including structural details or spatial arrangements may be inventively significant both individually and in extremely different combinations. For example, it is also possible for the surrounding member 19 which is formed by means of a flap 21 according to the embodiment in FIG. 5 and FIG. 6 to be applied to the embodiment of the clip element 12 according to FIGS. 1 and 2.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Hose clamp
10 Clamp band
11 Clamping device
12 Clip element
13 Hose
14 Hose end
15 Inner member
16 Outer member
17 Base member
18 Surrounding member
19 Surrounding member
20 Fixing formation
21 Flap
22 Retention projection
23 Wing
L Peripheral direction

The invention claimed is:

1. A hose clamp comprising a clamp band which extends in a peripheral direction (L) and comprising a clamping device for clamping the clamp band, the hose clamp further comprising at least one clip element arranged on the clamp band, wherein the hose clamp can be fixed by the at least one clip element to a hose with an axially determined spacing with respect to a hose end, and wherein the at least one clip element is received on the clamp band so as to be able to be moved in the peripheral direction (L), wherein the at least one clip element has a U-shaped surrounding member having an inner member and having an outer member, wherein the clamp band is guided through between the inner and outer members, wherein the inner member is clamped between the clamp band and a surface of the hose when the hose clamp is tightened to the hose, wherein retention flaps are provided on the inner member, on the outer member, or on both the inner and outer members, wherein lateral wings are provided on the inner member or the outer member opposite the retention flaps, around which the retention flaps are bent, wherein the lateral wings are formed by expansion of the inner member or the outer member in the peripheral direction.

2. The hose clamp as claimed in claim 1, wherein the at least one clip element is received on the clamp band, wherein the at least one clip element can be displaced with a specific movement force in the peripheral direction (L).

3. The hose clamp as claimed in claim 1, wherein the at least one clip element is received on the clamp band, wherein the at least one clip element at least partially engages around the clamp band and the at least one clip element and the clamp band are in a positive-locking engagement.

4. The hose clamp as claimed in claim 3, wherein the clamp band can be slid through as a result of the positive-locking geometry in the peripheral direction (L).

5. The hose clamp as claimed in claim 1, wherein the at least one surrounding member is adjoined by a fixing formation for fixing the at least one clip element to the hose end.

6. The hose clamp as claimed in claim 5, wherein the at least one clip element can be released from the clamp band when the clamp band is secured to the hose and clamped with the clamping device.

* * * * *